United States Patent [19]

Saam et al.

[11] 4,107,227
[45] Aug. 15, 1978

[54] METHOD FOR PREPARING IMPROVED POLYALPHAMETHYLS TYRENE-POLYDIORGANOSILOXANE BLOCK COPOLYMERS AND PRODUCTS THEREOF

[75] Inventors: John C. Saam, Midland; Andrew H. Ward, Sanford, both of Mich.

[73] Assignee: Dow Corning Corporation, Midland, Mich.

[21] Appl. No.: 748,788

[22] Filed: Dec. 9, 1976

[51] Int. Cl.² ............................................. C08L 83/10
[52] U.S. Cl. .................................. 260/827; 260/886; 428/447
[58] Field of Search ...................................... 260/827

[56] References Cited

U.S. PATENT DOCUMENTS

| 3,239,579 | 3/1966 | Barber et al. | 260/827 |
| 3,665,052 | 5/1972 | Saam et al. | 260/827 |
| 3,873,636 | 3/1975 | Saam et al. | 260/827 |

Primary Examiner—Harold D. Anderson
Assistant Examiner—Amelia B. Yarbrough
Attorney, Agent, or Firm—George A. Grindahl

[57] ABSTRACT

Block copolymers are prepared by coupling a poly-α-methylstyrene block with a polydiorganosiloxane block through a small amount of coupling units of the formula

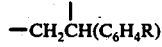

where R denotes an alkyl radical of 1 to 4 carbon atoms. The resulting block copolymers have an improved glass transition temperature, reaching a value of approximately the glass transition temperature of an analogous poly-α-methylstyrene when R is tertiary-butyl.

11 Claims, No Drawings

METHOD FOR PREPARING IMPROVED POLYALPHAMETHYLS TYRENE-POLYDIORGANOSILOXANE BLOCK COPOLYMERS AND PRODUCTS THEREOF

BACKGROUND OF THE INVENTION

This invention relates to a method for providing an improved block copolymer from α-methylstyrene, an alkylstyrene comonomer and a diorganocyclotrisiloxane. In one aspect this invention relates to thermoplastic block copolymers of the type $(BAB)_n$ wherein A denotes a thermoplastic, predominantly poly-α-methylstyrene block, which is coupled to the B blocks by way of an alkylstyrene comonomer, and B denotes an elastomeric polydiorganosiloxane block, said block copolymer having an upper operating temperature limit which is greater than that of the α-methylstyrene-diorganosiloxane block copolymers of the art.

Block copolymers comprising polyvinylmonomer segments, such as polystyrene, and polydiorganosiloxane segments are known from Morton, et al., U.S. Pat. No. 3,051,684, Bostick, U.S. Pat. No. 3,483,270, and Saam, et al. U.S. Pat. No. 3,873,636. Block copolymers of poly-α-methylstyrene and polydiorganosiloxane wherein the poly-α-methylstyrene blocks are not bonded directly to the polydiorganosiloxane blocks, but rather, are bonded indirectly through a styrene comonomer, are disclosed by Saam, et al., U.S. Pat. Nos. 3,665,052; 3,678,125, and 3,678,126 and by Kendrick, et al. U.S. Pat. No. 3,890,405. Similar block copolymers are disclosed by Davies, et al., Canadian Pat. No. 983,194 wherein styrene is preferred as the vinylic comonomer but other organic vinylic monomers are allowed if they are capable of being anionically polymerized and if their anion reacts with the diorganocyclotrisiloxane. Block copolymers of poly-α-methylstyrene and polydiorganosiloxane, which are prepared by anionic polymerization, need this coupling unit between the two blocks to stabilize the poly-α-methylstyrene block against depolymerization under the conditions that are used when the poly-α-methylstyrene is reacted with the diorganosiloxane monomer, i.e. hexaorganocyclotrisiloxane.

The poly-α-methylstyrene-polydiorganosiloxane block copolymers of the art, wherein the poly-α-methylstyrene block is bonded to a polydimethylsiloxane block by way of a short polystyrene segment, have an upper glass transition temperature, hereinafter Tg, of approximately 125° C. This value is unexpectedly low because the upper Tg of a poly-α-methylstyrene-polydiorganosiloxane block copolymer is expected to be approximately equal to the Tg of the poly-α-methylstyrene block, which has a value of approximately 155° C. at $\overline{M}_A$ of 8,000 and a value as high as 180° C. at higher molecular weights. A second Tg, characteristic of the polydiorganosiloxane block is also expected; however, the Tg of most polydiorganosiloxanes is less than the Tg of poly-α-methylstyrene and does not constitute an upper operating temperature limit for a poly-α-methylstyrene-polydiorganosiloxane block coploymer.

Thermoplastic block coploymers derive their physical properties, such as tensile strength, in part from the strength of their glassy thermoplastic block. Consequently, considerable strength is lost when said block copolymers are subjected to temperatures above their Tg; the Tg thereby constituting an upper operating temperature limit for the block copolymer for many uses. It is therefore desirable to increase the Tg of poly-α-methylstyrene-polydiorganosiloxane block copolymers, thereby providing block copolymers having an increased upper operating temperature limit and hence being suitable for use in more stringent thermal environments.

Although the references cited above suggest that certain alkylstyrenes may be used to prepare polyvinylmonomer-polydiorganosiloxane block copolymers, there is no suggestion that a poly-α-methylstyrene block can be coupled to a polydiorganosiloxane block by way of an alkylstyrene segment to prepare a block copolymer, nor is there any suggestion that such a block copolymer would have improved properties.

SUMMARY OF THE INVENTION

It is an object of this invention to provide a method for improving the upper temperature limit of poly-α-methylstyrene-polydiorganosiloxane block copolymers.

It is another object of this invention to provide new block copolymers comprising at least one predominantly poly-α-methylstyrene block and at least one polydiorganosiloxane block.

These and other objects will be obvious to one skilled in the copolymer art after considering the following specification and appended claims.

We have found that when an alkylstyrene is used in place of styrene as a vinylic comonomer for coupling a poly-α-methylstyrene block to a polydiorganosiloxane block the Tg of the block copolymer is increased. The increase in the Tg is related to the amount of alkylstyrene comonomer that is used and to the size of the alkyl group on the alkylstyrene comonomer.

DESCRIPTION OF THE INVENTION

This invention relates to a method of increasing the upper glass transition temperature of a poly-α-methylstyrene-polydiorganosiloxane block copolymer, said method comprising coupling at least one poly-α-methylstyrene block with at least one polydiorganosiloxane block through at least one coupling unit of the formula

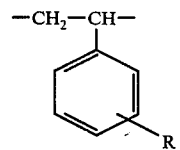

where R is an alkyl radical of from 1 to 4 carbon atoms, inclusive, any terminal poly-α-methylstyrene block being terminated by a monovalent hydrocarbon radical and any terminal polydiorganosiloxane block being terminated by a silicon-bonded hydroxy radical or a siloxane unit of the formula

where each R' is selected from the group consisting of a monovalent hydrocarbon radical, a monovalent halogenated hydrocarbon radical and a hydrolyzable radical, and each organic radical of the polydiorganosiloxane is a monovalent hydrocarbon radical or a halogenated monovalent hydrocarbon radical of 1 to 6 inclusive carbon atoms and obtaining a block copolymer containing at least one poly-α-methylstyrene block and at least one polydiorganosiloxane block and having a higher glass transition temperature than an equivalent block copolymer wherein the coupling unit has the formula

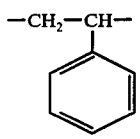

This invention further relates to a novel block copolymer consisting essentially of at least one poly-α-methylstyrene block bonded through at least one coupling unit of the formula

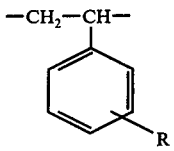

where R is an alkyl radical of 1 to 4 carbon atoms, inclusive, to at least one polydiorganosiloxane block, any terminal poly-α-methylstyrene block being terminated by a monovalent hydrocarbon radical, any terminal polydiorganosiloxane block being terminated by a silicon-bonded hydroxyl radical or a siloxane unit of the formula $R'_3SiO_{1/2}$ where each R' is selected from the group consisting of a monovalent hydrocarbon radical, a monovalent halogenated hydrocarbon radical and a hydrolyzable radical and each organic radical of the polydiorganosiloxane is a monovalent hydrocarbon radical or a halogenated monovalent hydrocarbon radical of 1 to 6, inclusive, carbon atoms, said block copolymer having at least 15 α-methylstyrene units per block and at least 15 diorganosiloxane units per block.

The coupling units of the block copolymers of this invention have the unit formula

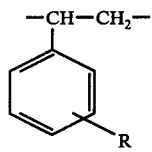

R is an alkyl radical having from 1 to 4 carbon atoms such as methyl, ethyl, propyl, isopropyl, butyl, secondary-butyl, isobutyl and tertiary-butyl. The position occupied by the R group on the aromatic ring of the coupling units is not critical but it is preferred that when the R group has more than one carbon atom said group is not located in the ortho position, i.e. on an aromatic carbon which is adjacent to the aromatic carbon bearing the

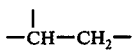

residue.

The polydiorganosiloxane block is composed of a plurality of diorganosiloxane units of the formula $R''_2SiO_{2/2}$ wherein each R'' is, independently, a monovalent radical having from 1 to 6 carbon atoms selected from the group consisting of hydrocarbon radicals and halogenated hydrocarbon radicals. Exemplary of hydrocarbon radicals suitable as R'' are methyl, ethyl, vinyl, isopropyl, butyl, cyclohexyl, cyclohexenyl, and phenyl. Exemplary of halogenated hydrocarbon radicals suitable as R'' are perfluoroalkethyl radicals, such as 3,3,3-trifluoropropyl and pentafluorobutyl; chlorophenyl and pentafluorophenyl. Suitable diorganosiloxane units for the polydiorganosiloxane block therefore include, but are not limited to, dimethylsiloxane, phenylmethylsiloxane, methyl-3,3,3-trifluoropropylsiloxane, diphenylsiloxane, methylvinylsiloxane, diethylsiloxane and methylisopropylsiloxane. It is to be understood that one or more kinds of said diorganosiloxane units may be present in any polydiorganosiloxane block, if desired. It is preferred that at least 50 percent of all R'' radicals are methyl, there being, preferably, at least one methyl radical on each diorganosiloxane unit of the polydiorganosiloxane block. Most preferably the polydiorganosiloxane blocks of the block copolymers of this invention are polydimethylsiloxane blocks.

The block copolymers of this invention may have one or more of several arrangements of A blocks and B blocks including, but not limited to, AB, BAB, ABA, $(AB)_n$, $(BAB)_n$ and $(ABA)_n$ wherein $n$ has an average value of greater than 1, such as 1.5, 2, 3, 4, 5, 6, 7, 8, 9, 10, 15, 20, 50, and more. A denotes an organic block consisting of a poly-α-methylstyrene block and accompanying coupling units and B denotes a polydiorganosiloxane block. There is at least one R-containing coupling unit, hereinabove delineated, which couples any poly-α-methylstyrene block to any adjacent polydiorganosiloxane blocks. It is to be understood that where there is more than one of said coupling units present in the block copolymer, they may be of a single kind, such as coupling units wherein all R radicals are para tertiary-butyl, or a mixture of two or more kinds of coupling units such as a mixture of coupling units wherein the R radicals vary in position only, such as a mixture of meta and para tertiary-butyl radicals or a mixture of units wherein the R radicals vary in kind only such as a mixture of para tertiary-butyl and para secondary-butyl radicals or a mixture of para tertiary-butyl and para isopropyl radicals or a mixture of coupling units wherein the R radicals vary by position and kind.

Block copolymers of this invention bearing terminal A blocks such as AB, ABA, $(AB)_n$ and $(ABA)_n$ have, as the terminating radical of the terminal A block, a hydrogen atom arising from termination of a living A block or a monovalent hydrocarbon radical having from 1 to 30 carbon atoms such as butyl, alkylstyryl, α-methylstyryl, phenyl, naphthyl and anthracyl and arising from the organic residue of a polymerization catalyst. Block copolymers bearing terminal B blocks such as AB, BAB, $(AB)_n$ and $(BAB)_n$ have, as the terminated radical of the terminal B block a silicon-bonded hydroxyl radical or a siloxane unit of the formula $R'_3SiO_{1/2}$ wherein each R' is a monovalent hydrocarbon radical or a monovalent halogenated hydrocarbon radical or a hydrolyzable radical. Examples of monovalent hydrocarbon radicals and monovalent halogenated hydrocarbon radicals suitable as R' include, but are not limited to, the R'' radicals exemplified hereinabove. Examples of hydrolyzable radicals include, but are not limited to, a halo radical, such as fluoro, chloro, bromo and iodo; an alkoxy radical, such as methoxy, ethoxy, isopropoxy and CH₃OCH₂CH₂O—; an acyloxy radcal, such as acetoxy; an amino radical, such as dimethylamino; an oximo radical, such as a ketoximo radical, such as methylethylketoximo and an aminoxy radical, such as diethylaminoxy. A block compolymer bearing a terminal B block may have any kind or mixture of kinds of terminating radicals on the terminal B block, if desired.

The block copolymers of this invention have at least 15 α-methylstyrene units per A block and at least 15 diorganosiloxane units per B block. There is no theoretical upper limit to the number of monomer units in either the A block or the B block and block copolymers having more than 15, e.g. 20, 30, 50, 100, and more α-methylstyrene units and/or diorganosiloxane units will have greater utility as thermoplastic resins and thermoplastic elastomers.

Many diblock and triblock copolymers of the formulae AB, BAB, and ABA may not have sufficient molecular weight to possess optimum mechanical properties although they may be useful for non-mechanical applications. Accordingly, it may be desirable to prepare condensed block copolymers of higher molecular weight, such as $(AB)_n$, $(ABA)_n$, and $(BAB)_n$ wherein $n$ is as hereinbefore delineated. Said condensing may be accomplished by any suitable means. There is no theoretical upper limit to the value of $n$. Significant improvement in physical properties is obtained when $n$ has an average value of 2 or more, preferably 5 or more; however, in practice, block copolymers wherein $n$ has an average value of greater than 25 are difficult to prepare.

In common with the prior art, condensed block compolymers of this invention wherein the polydiorganosiloxane blocks account for from approximately 40 to 60 percent by weight of the block copolymer, the remainder being A blocks, find utility as thermoplastic resins having improved properties. Also in common with prior art, condensed block copolymers of this invention wherein the polydiorganosiloxane blocks account for from approximately 50 to 90 percent by weight of the block copolymer, the remainder being A blocks, find utility as thermoplastic elastomers having improved properties. However, said block copolymers are only useful as thermoplastic elastomers when the calculated molecular weight of the A block, i.e. $\overline{M}_A$ as hereinafter defined, has a value of from 2000 to 20,000, preferably from 5000 to 15,000.

The block copolymers of this invention find utility whereever analogous poly-α-methylstyrene-polydiorganosiloxane block copolymers of the art are used. Depending upon the molecular weight of the block copolymer and other parameters, hereinbefore described, the block copolymers of this invention are useful for preparing a blown film, an extruded tube, a molded article, a composite laminate, a solvent-based coating, an emulsion-based coating and as an additive in other compositions such as silicone compositions, organic compositions and in organic-silicone compositions.

Certain of the poly-α-methylstyrene-polydimethylsiloxane block copolymers of this invention have exceptional transparency to visible light, high oxidative stability and weatherability, and good dielectric properties; some are permeable to gases. Accordingly said block copolymers find utility as a wire coating, a packaging film, a glass interlayer, an electronic coating compositions, and as a permeable membrane for medical use.

The block copolymers of this invention have a higher Tg than do the analogous styrene-coupled block copolymers of the art and therefor find additional utility.

The amount of increase in the Tg of the block copolymers of this invention is dependent upon two parameters. There is a direct relationship between the size of, i.e. the number of carbon atoms in, the R group of the coupling unit, and the Tg-elevating effect. Coupling units wherein all R radicals are butyl are therefore preferred because, for any given concentration of coupling units, there is provided a Tg for the block copolymers of this invention which most nearly approaches the Tg of a poly-α-methylstyrene of similar molecular weight. Also, the Tg of the block copolymers of this invention is increased only when the amount of coupling units constitutes less than 30 percent by weight, and preferably 20 percent or less, of the A block based on the total weight of the A block.

Accordingly, this invention provides a method for increasing the Tg of a poly-α-methylstyrene-polydiorganosiloxane block copolymer wherein the coupling units have the formula

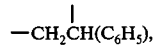

said method comprising substituting for said coupling units coupling units of the formula

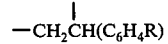

wherein R is as hereinbefore delineated.

The poly-α-methylstyrene blocks and the polydiorganosiloxane blocks may be coupled by any suitable method. A preferred method which may be adapted for preparing the block copolymers of this invention is disclosed by Saam, et al. U.S. Pat. Nos. 3,665,052; 3,678,125 and 3,678,126 which are hereby incorporated by reference to show said method and the solvents, initiators, precautions, temperatures, reactant amounts, promoters, purification steps and condensing components suitable therefore. In said method, α-methylstyrene is polymerized at low temperatures in a suitable organic solvent using a carbanion-producing catalyst such as a lithium-containing material such as butyl lithium, dilithiostilbene, or diphenyllithium to produce a "living" poly-α-methylstyrene polymer. The living polymer, bearing one or two lithium-terminated ends, depending upon the type of carbanion-producing catalyst that was used, is then reacted with styrene which provides a lithium-terminated A block consisting essentially of a poly-α-methylstyrene segment bearing, on one or both ends, one or more coupling units derived from the styrene comonomer.

In the method of this invention an alkyl styrene of the formula CH₂=CH(C₆H₄R) is used instead of styrene as the comonomer, thereby providing coupling units of the formula —CH₂CH(C₆H₄R) hereinbefore delineated. Alkyl styrenes suitable as a comonomer in this method include methylstyrene, ethylstyrene, n-propylstyrene, i-propylstyrene, n-butylstyrene, s-butylstyrene, i-butylstyrene, and t-butylstyrene. It is to be understood that the alkylstyrene comonomer may be of a single type such as para-t-butylstyrene or said comonomer may be a mixture of alkylstyrenes, the components of which vary only in the position of the R radical on the aromatic ring, or only in the type of R radical on the aromatic ring or in both position and type of R radical on the aromatic ring.

In the method of Saam, et al., the solution of lithium-terminated A block is then mixed with a suitable amount of hexaorganocyclotrisiloxane and the mixture is warmed sufficiently to permit a reasonably rapid reaction with the hexaorganocyclotrisiloxane in a ring opening polymerization of the cyclotrisiloxane, thereby coupling diorganosiloxane units to the A block through the coupling unit to form and bond the B block.

The lithium-silanolate-terminated diblock or triblock copolymer that is obtained may be endblocked to provide a block copolymer of the type AB or BAB. Endblocking with a silicon-bond hydroxyl radical may be accomplished by mixing with the lithium-silanolate terminated diblock or triblock copolymer a reactant bearing an active hydrogen such as water or an acid such as acetic acid and washing out the by-produced lithium hydroxide or lithium acetate. Any lithium-silanolate ends are thereby replaced with hydroxyl radicals. The hydroxyl-endblocked block copolymer may be further condensed, if desired, in the well-known fashion. If a triorganosiloxane-endblocked block copolymer is desired the lithium-terminated block copolymer may be mixed with $R'_4Si$ wherein one $R'$ is a hydrolyzable radical hereinbefore delineated and each remaining radical is a monovalent hydrocarbon radical or halogenated monovalent hydrocarbon radical. Exemplary of suitable $R'_4Si$ are $R'_3SiCl$ such as $(CH_3)_3SiCl$, $CF_3CH_2CH_2(CH_3)_2SiCl$ and $CH_2=CH(CH_3)_2SiCl$ and $R'_3SiOAc$ such as $(CH_3)_3SiOAc$ where Ac is $CH_3CO$—.

The lithium-silanolate-terminated diblock or triblock copolymer may be condensed to provide block copolymers of higher molecular weight such as $(AB)_x$ and $(BAB)_{xm}$ wherein $x$ has a value of from 2 to 4 and $m$ has a value such that the value of $xm$ has an average value of greater than 1. Condensing may be accomplished by mixing the lithium-silanolate-terminated block copolymer with $R'_4Si$ wherein at least $x$ $R'$ radicals are hydrolyzable radicals and any remaining $R'$ radicals are as hereinabove delineated. Exemplary of suitable $R'_4Si$ are $R'_2SiCl_2$ such as $(CH_3)_2SiCl_2$, $CF_3CH_2CH_2(CH_3)SiCl_2$, $CH_3(CH_2=CH)SiCl_2$ and $(C_6H_5)_2SiCl_2$; $R'SiCl_3$ such as $CH_3SiCl_3$, $CF_3CH_2CH_2SiCl_3$, $C_6H_5SiCl_3$, and $CH_2=CHSiCl_3$ and $SiCl_4$.

A preferred condensed block copolymer of this invention is obtained when a lithium-terminated BAB triblock copolymer is mixed with a stoichiometric amount of a diorganosilane such as a diorganodichlorosilane. By stoichiometric it is meant that there is one hydrolyzable group in the diorganosilane for every lithium atom in the block copolymer. There is obtained, a condensed linear block copolymer of the formula $(BAB)_n$ containing $n$ BAB triblocks bonded together by $n-1$

units wherein $n$ has an average value greater than 1, such as 2, 3, 4, 5, 10, and more.

The block copolymers of this invention may also be prepared using other carbanion-containing catalysts such as sodium-containing initiators such as sodium, sodium stilbene, sodium naphthalene, sodium α-methylstyrene tetramer and sodium biphenyl, hereinafter exemplified.

It is believed that the following examples show the best way to practice this invention.

The following examples are included to better enable those skilled in the art to practice this invention. They are not to be construed as limiting the invention which is delineated by the appended claims.

Tensile strength was measured in pounds per square inch and was converted to pascals (Pa) by multiplying by 6894.757 and rounding off. Tensile and elongation values were obtained by pulling "dog-bone" tensile bars at 10 inches per minute using an Instron ®.

Glass transition temperature (Tg) measurement were made using a direct reading Rheovibron ® dynamic viscoelastometer. The force that was needed to vibrate the block copolymer sample at a given amplitude and at a given frequency i.e. 3.5Hz, was measured as a function of sample temperature. From this force was calculated the modulus $E'$ and loss modulus $E''$ for the sample as a function of temperature. Tg is the temperature at which maximum $E''$ occurs.

The number average molecular weight $\overline{M}_A$ of the organic block is a calculated value which is equal to the total weight of the organic monomers divided by the numbers of mols of active alkali metal initiator. The number of mols of active alkali metal initiator is equal to the number of mols of alkali metal divided by the functionality of the initiator which is 2 in the following examples.

Preparation of the block copolymers of this invention was accomplished in an atmosphere of prepurified nitrogen, bubbled through fuming $H_2SO_4$ and successively passed over KOH, molecular sieves and Drierite ®. All glassware was baked overnight at 150° C. and cooled under dry nitrogen. Toluene, α-methylstyrene, vinylic comonomer and hexamethylcyclotrisiloxane were passed through an aluminum bed under a countercurrent flow of dry nitrogen just before use. Glyme ($CH_3OCH_2CH_2OCH_3$) was distilled from sodium benzophenone. Biphenyl was used as received. Dimethyldichlorosilane was distilled under dry nitrogen. Lithium and sodium biphenyl were prepared and titrated by standard techniques.

EXAMPLE 1

To a solution of 200 ml. of toluene, 10 ml. of glyme and 40.0 g. (0.339 mols) of α-methylstyrene was added, at room temperature, 12.8 ml. of a 0.98 N solution of sodium biphenyl (12.5 millimols) in glyme. The reaction mixture was cooled to and held at the temperature of Dry Ice/acetone slush for 30 minutes. Tertiary-butyl styrene, 10.0 g. (0.063 mols) and 50.0 g. (0.675 mols of $(CH_3)_2SiO_{2/2}$) of hexamethylcyclotrisiloxane in 75 ml. of toluene were added to the cold, polymerized α-methylstyrene. After 2 hours of mild heating (~40° C.) the block copolymer was coupled using 6.25 millimols of dimethyldichlorosilane. After 15 minutes of vigorous stirring the reaction mixture was filtered and the precipitate was air dried to give a copolymer having a melt flow index at 270° C. of 7.5 g/10 min. and a Tg of 153° C. The copolymer was approximately 50 percent by weight polydimethylsiloxane and approximately 50 percent by weight organic polymer, the organic polymer blocks being 80 percent by weight poly-α-methylstyrene and 20 percent by weight poly-t-butylstyrene and having an $\overline{M}_A$ of 8000.

A series of similar block copolymers was prepared wherein the organic portion of the block copolymer was kept at 40 weight percent, based on the total weight of the block copolymer, and the $\overline{M}_A$ of the organic blocks was kept at 8000, but the weight percent of the t-butylstyrene in the organic block, based on the weight of the organic block was varied from 5 to 100 percent. Table I, which summarizes the Tg measurements on the resulting polymers, shows that an elevation of Tg does not occur when the amount of t-butylstyrene is 30 weight percent or more, based on the weight of the organic block.

TABLE I

| t-Butylstyrene (W%) | α-Methylstyrene (W%) | Tg (° C) |
|---|---|---|
| 100 | 0 | 93 |
| 30 | 70 | 127 |
| 20 | 80 | 156 |
| 5 | 95 | 154 |

EXAMPLE 2

Block copolymers of α-methylstyrene and hexamethylcyclotrisiloxane were prepared as in Example 1 except that styrene, vinyltoluene, ethylstyrene, vinylpyridine, and vinyltrimethylsilane were used in place of t-butylstyrene as the vinylic comonomer. In each case the $\overline{M}_A$ of the organic block was kept at 8000. The organic block was 20 W% vinylic comonomer and 80% α-methylstyrene and constituted 40 W% of the block copolymer. The Tg of each block copolymer was measured and the tensile strength and elongation at 25° C. and 150° C. were also measured. The data, summarized on Table II, show that the Tg values for the block copolymers of this invention are higher than the Tg values for analogous block copolymer of the art. Table II also shows that the tensile strength at 150° C. of the block copolymer of this invention wherein the vinylic comonomer is t-butylstyrene is approximately two times greater than the tensile strength at 150° C. of the analogous block copolymer of the art.

TABLE II

| Vinylic Comonomer | Tg (° C) | Tensile Strength (MPa) 25° C | Tensile Strength (MPa) 150° C | Elongation (%) 25° C | Elongation (%) 150° C |
|---|---|---|---|---|---|
| Styrene (prior art)* | 126 | 16.5 | 0.62 | 700 | 1100 |
| Vinyltoluene | 136 | 13.7 | 0.55 | 748 | 2960 |
| Ethylstyrene | 145 | — | — | — | — |
| t-Butylstyrene | 156 | 13.4 | 1.13 | 760 | 1330 |
| Vinylpyridine | ** | — | — | — | — |
| Vinyltrimethylsilane | ** | — | — | — | — |

*Initiated by lithium biphenyl in tetrahydrofuran.
**No copolymer was formed.

EXAMPLE 3

A block copolymer of 33 ml. (30 g.) of α-methylstyrene, 11 ml. (10 g.) of t-butylstyrene and 150 ml. of 40 W% solution (60 g.) of hexamethylcyclotrisiloxane in toluene was prepared as in Example 1 except that the initiator was 10 ml. of a 1.0 N solution of lithium biphenyl in glyme (10 millimols). The polymerization of hexamethylcyclotrisiloxane was allowed to continue overnight before the block copolymer was coupled using 0.58 ml. (0.68 g. = 5.25 millimols) of dimethyldichlorosilane. The recovered block copolymer, which had a Tg of 155° C., was approximately 40 W% organic. The organic block had a $\overline{M}_A$ of 8000 and was 25 W% t-butylstyrene, based on the weight of the organic block.

EXAMPLE 4

A series of block copolymers was prepared as in Example 1 wherein the organic block was 20 W% t-butylstyrene and 80 W% α-methylstyrene and constituted 40 W% of the block copolymer; however, the $\overline{M}_A$ of the organic block was varied. Table III shows that useful tensile strength and elongation are obtained as long as the $\overline{M}_A$ of the organic block is not as large as 20,000.

TABLE III

| $M_A$ (Organic Block) | Tensile Strength (MPa) | Elongation (%) |
|---|---|---|
| 5000 | 3.45 | 100 |
| 7000 | 15.86 | 600 |
| 8000 | 15.17 | 560 |
| 11000 | 11.17 | 550 |
| 20000 | — | 10 |

EXAMPLE 5

A series of block copolymers was prepared as in Example 1 wherein the organic block was 20 W% t-butylstyrene and 80% α-methylstyrene and had an $\overline{M}_A$ of 8000; however, the percentage by weight of the organic block in the block copolymer was varied. Table IV shows that useful tensile strength and elongation are obtained from these block copolymers as long as the weight percent of organic block does not reach approximately 60 W%, based on the weight of the block copolymer.

TABLE IV

| Organic Block (W%) | Tensile Strength (MPa) | Elongation(%) |
|---|---|---|
| 10 | 3.45 | 1400 |
| 20 | 8.48 | 1340 |
| 30 | 14.82 | 1000 |
| 40 | 15.17 | 500 |
| 50 | 15.17 | 300 |
| 60 | 0 | — |

That which is claimed is:

1. A method of increasing the upper glass transition temperature of a poly-α-methylstyrene-polydiorganosiloxane block copolymer, said method comprising coupling at least one poly-α-methylstyrene block with at least one polydiorganosiloxane block through at least one coupling unit of the formula

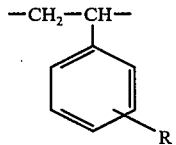

where R is an alkyl radical of from 1 to 4 carbon atoms, inclusive, any terminal poly-α-methylstyrene block being terminated by a monovalent hydrocarbon radical and any terminal polydiorganosiloxane block being terminated by a silicon-bonded hydroxy radical or a siloxane unit of the formula

where each R' is selected from the group consisting of a monovalent hydrocarbon radical, a monovalent halogenated hydrocarbon radical and a hydrolyzable radical, and each organic radical of the polydiorganosiloxane is a monovalent hydrocarbon radical or a halogenated monovalent hydrocarbon radical of from 1 to 6, inclusive, carbon atoms and obtaining a block copolymer containing at least one poly-α-methylstyrene block and at least one polydiorganosiloxane block and having a higher glass transition temperature than an equivalent block copolymer wherein the coupling unit has the formula

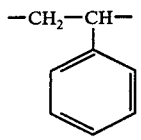

2. The method in accordance with claim 1 in which the poly-α-methylstyrene block is prepared by anionic polymerization using a lithium or sodium initiation catalyst to provide a living polymer and thereafter an alkylstyrene comonomer and a hexaorganocyclotrisiloxane are mixed with the living polymer and the polymerization is continued until a block copolymer is obtained.

3. The method in accordance with claim 2 in which a block copolymer which contains at least one lithium or sodium terminating atom is condensed by adding a dichlorodiorganosilane where the organic group of said silane is a monovalent radical selected from the group consisting of hydrocarbon radicals or halogenated hydrocarbon radicals and a higher molecular weight condensed block copolymer is obtained.

4. The method in accordance with claim 3 in which the block copolymer has the formula BAB and consists essentially of two lithium- or sodium-terminated polydiorganosiloxane B blocks each coupled to a central poly-α-methylstyrene block by way of at least one of said coupling units, A denoting the total of poly-α-methylstyrene plus coupling units, thereby obtaining a high molecular weight condensed linear block copolymer of the average formula $(BAB)_n$ wherein $n$ has an average value of greater than 1.

5. The method in accordance with claim 4 wherein the polydiorganosiloxane block is a polydimethylsiloxane block and the R group of the coupling units is tertiary-butyl.

6. A block copolymer prepared by the method of claim 3.

7. A block copolymer consisting essentially of at least one poly-α-methylstyrene block bonded through at least one coupling unit of the formula

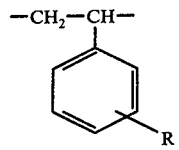

where R is an alkyl radical of 1 to 4 carbon atoms inclusive, to at least one polydiorganosiloxane block, any terminal poly-α-methylstyrene block being terminated by a monovalent hydrocarbon radical, any terminal polydiorganosiloxane block being terminated by a silicon-bonded hydroxyl radical or a siloxane unit of the formula $$R'_3SiO_{1/2}$$

where each R' is selected from the group consisting of a monovalent hydrocarbon radical, a monovalent halogenated hydrocarbon radical and a hydrolyzable radical and each organic radical of the polydiorganosiloxane is a monovalent hydrocarbon radical or a halogenated monovalent hydrocarbon radical of from 1 to 6, inclusive carbon atoms, said block copolymer having at least 15-α-methylstyrene units per block and at least 15 diorganosiloxane units per block.

8. A condensed linear block copolymer according to claim 7 having the formula $(BAB)_n$ wherein B is a polydiorganosiloxane block bonded to a central A block consisting of a poly-α-methylstyrene block plus coupling units, and $n$ has an average value of greater than 1.

9. The block copolymer according to claim 8 in which R is tertiary-butyl and the polydiorganosiloxane blocks are polydimethylsiloxane blocks.

10. The block copolymer according to claim 9 in which the poly-α-methylstyrene plus coupling units is present in an amount of from 10 to 60 weight percent and the polydimethylsiloxane is present in an amount of from 40 to 90 weight percent based on the total weight of the block copolymer and the coupling units of the formula

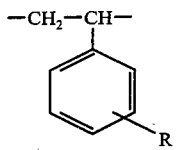

are present in an amount of from 2 to 30 weight percent based on the total weight of said poly-α-methylstyrene plus coupling units.

11. A thermoplastic, elastomeric block copolymer according to claim 10.

* * * * *